United States Patent [19]

Servais et al.

[11] Patent Number: 5,374,451
[45] Date of Patent: Dec. 20, 1994

[54] REFLECTIVE ARTICLES AND METHODS OF MANUFACTURING SAME

[75] Inventors: Albert Servais; Christian Dauby, both of Gerpinnes; Bernard Somerhausen, Nivelles, all of Belgium

[73] Assignee: Glaverbel, Brussels, Belgium

[21] Appl. No.: 108,446

[22] Filed: Aug. 19, 1993

Related U.S. Application Data

[62] Division of Ser. No. 786,826, Nov. 1, 1991, Pat. No. 5,296,297.

[30] Foreign Application Priority Data

Nov. 3, 1990 [GB] United Kingdom ............ 9023949
Apr. 16, 1991 [GB] United Kingdom ............ 9108009

[51] Int. Cl.$^5$ .................................. B05D 5/06
[52] U.S. Cl. ............................ 427/165; 427/250; 427/343; 427/404; 427/407.2
[58] Field of Search ............ 427/165, 343, 404, 407.2, 427/250

[56] References Cited

U.S. PATENT DOCUMENTS

| | | | |
|---|---|---|---|
| 4,251,316 | 2/1981 | Smallbone | 427/165 |
| 4,511,618 | 4/1985 | Duchene et al. | 428/215 |
| 4,894,278 | 1/1990 | Servais et al. | 427/165 |
| 5,156,917 | 10/1992 | Sanford | 428/426 |

FOREIGN PATENT DOCUMENTS

| | | |
|---|---|---|
| 0259748 | 3/1988 | European Pat. Off. |
| 865709 | 2/1940 | France . |
| 2217285 | 9/1974 | France . |
| 822715 | 7/1949 | Germany . |
| 2200218 | 8/1990 | Japan . |
| 404595 | 4/1932 | United Kingdom . |
| 0395491 | 7/1933 | United Kingdom . |
| 1325959 | 8/1973 | United Kingdom . |
| 1361101 | 7/1974 | United Kingdom . |
| 1528205 | 10/1978 | United Kingdom . |
| 2068415 | 8/1981 | United Kingdom . |
| 2158845 | 11/1985 | United Kingdom . |
| 2206129 | 12/1988 | United Kingdom . |
| WO81/02311 | 8/1981 | WIPO . |

*Primary Examiner*—Janyce Bell
*Attorney, Agent, or Firm*—Spencer, Frank & Schneider

[57] ABSTRACT

A reflective article such as a mirror or an energy-screening transparent panel comprises a reflective metal coating deposited on a glass substrate. The metal coating comprises a reflective layer of silver and has been treated with a solution containing ions of at least one of the group consisting of: Cr (II); V (II or III); Ti (III or II); Fe (II); In (I or II); Cu (I); and Al (III). Such a treatment affords protection of the reflective coating against corrosion.

13 Claims, No Drawings

REFLECTIVE ARTICLES AND METHODS OF MANUFACTURING SAME

This is a division of application Ser. No. 07/786,826 filed Nov. 1, 1991, now U.S. Pat. No. 5,296,297.

BACKGROUND OF THE INVENTION

1. Field of the Invention

This invention relates to reflective articles comprising a reflective metal coating deposited on a glass substrate, and it extends to methods of manufacturing such articles.

Such a metal coating may be deposited pattern-wise to form a decorative article, but the invention has particular reference to glass substrates bearing a continuous reflective coating. The coating may be applied to a substrate of any form, for example to an artistic object, to achieve some desired decorative effect, but it is envisaged that the invention will find greatest use when the coating is applied to a sheet glass substrate. The reflective coating may be so thin that it is transparent. Glass panes bearing transparent reflective coatings are useful inter alia as solar screening panels or as low-emissivity (in respect of infra-red radiation) panels. Alternatively, the coating may be fully reflective, thus forming a mirror-coating. Such a mirror may be plane, or it may be curved.

2. Description of the Related Art

Reflective metal coatings, e.g. of silver, are apt to be attacked by atmospheric pollution with the result that the silver layer becomes tarnished so that the required optical properties of that layer are lost. It is accordingly known to apply protective layers to such a silver layer, the nature of the protective layer being determined by the required properties of the coated substrate and by cost.

For example, transparent silver layers such as may be used in solar screening coatings may be protected against corrosion by overcoating them with one or more transparent metal oxide layers. Such silver layers are often formed by a vacuum deposition technique, and the protective layer(s) is or are also formed by vacuum deposition, often in the same apparatus, to avoid risk of marring the silver layer. Such protective layers are expensive to form.

Front-silvered mirrors may be protected in the same way.

Back-silvered mirrors may be protected by one or more opaque layers, since the optical properties of the rear face of a mirror are largely irrelevant, and that face is anyway usually hidden from view in some form of mirror mounting.

According to classical methods, mirrors are manufactured by sensitizing a glass sheet, applying a silvering solution to form a silver reflective layer, overcoating that silver layer with a protective layer of copper, and then painting the copper layer to produce the finished mirror.

The purpose of the copper layer is to retard tarnishing of the silver layer, and the copper layer is itself protected from abrasion and corrosion by the layer of paint.

Of the various paint formulations which could be used for protecting a mirror, those which afford the best protection against corrosion of the copper layer contain lead pigments. Unfortunately lead pigments are toxic and their use is being increasingly discouraged for reasons of environmental health.

SUMMARY OF THE INVENTION

The present invention results from research into the problem of finding another simple and effective way of protecting a said reflective metal coating against corrosion.

According to this invention, there is provided a reflective article comprising a reflective metal coating deposited on a glass substrate, characterized in that said metal coating comprises a reflective layer of silver and has been treated with a solution containing ions of at least one of the group consisting of: Cr(II); V(II or III); Ti(III or II); Fe(II); In(I or II); Cu(I); and Al(III).

The present invention also provides a method of manufacturing a reflective article comprising a reflective metal coating deposited on a glass substrate, characterized in that such method comprises the following steps: forming a metal coating comprising a reflective layer of silver on a surface of the substrate, contacting the metal coating with a treatment solution containing ions of at least one of the group consisting of: Cr(II); V(II or III); Ti(III or II); Fe(II); In(I or II); Cu(I); and Al(III), and washing and drying the thus treated metal coating.

It is found that the metal coating of a reflective article according to the invention is afforded a measure of protection against corrosion by treatment with a said treatment solution. The method of manufacturing such a reflective article can also be very simple and economical to perform.

Such an article may have its reflective metal coating protected against abrasion in any suitable way. For example, front-silvered curved mirrors forming parts of a catadioptric lens system will be protected against abrasion by other lens components. In such a case, the principal advantage of the invention may lie in protecting the mirror against tarnishing during the interval between its manufacture and its incorporation into the lens, though the treatment of the invention will also be valuable where the lens system is not hermetically sealed, or in case any such seal fails.

In some preferred embodiments of the invention, the metal coating is a transparent coating applied to a glass sheet which is held in spaced relation from at least one other glass sheet to form a hollow glazing unit, the metal coating being located inside the glazing unit. In such embodiments, the metal coating is protected against abrasion by its enclosure within the hollow glazing unit, and the treatment of the invention serves to protect that coating against corrosion before its incorporation into the glazing unit and in the event of any failure of the hermetic sealing (if any) of that unit. Such units are useful for reducing the emission of infra-red radiation and/or for solar screening purposes.

In other preferred embodiments of the invention, the metal coating is applied to a glass sheet as an opaque coating to form a mirror. Embodiments of the invention wherein the said article is constituted as a mirror are useful for many purposes, for example as ordinary plane domestic mirrors, or as rear view mirrors for motor vehicles.

In preferred embodiments of the invention useful as back-silvered mirrors, the metal coating is overcoated with at least one protective layer of paint. In such embodiments, the metal coating is afforded a measure of protection against corrosion by the treatment which characterizes the invention, and against abrasion by the paint.

Advantageously, a said paint layer has been applied to said metal coating after the latter has been treated with a silane. Contacting said metal coating with a silane before painting can promote adhesion of the paint to the treated metal coating, so promoting resistance of the reflective article to abrasion and corrosion.

Preferably, for health reasons, the paint is substantially lead-free.

In some preferred embodiments of the invention, especially those in which the reflective metal coating is transparent, said metal coating is applied by vacuum deposition. This is admittedly a rather expensive way of forming such a coating, but it has the advantage of allowing very fine control over the thickness, and uniformity of thickness, of that coating, and it also allows the formation of high quality transparent coatings and of very thin coatings, for example coatings having a thickness in the range 8 nm to 30 nm which have very good properties for use as solar screening and/or low emissivity coatings.

In the manufacture of a reflective article according to this invention embodied as a back-silvered mirror, the presence of a copper layer on top of the reflective silver layer is not essential, as it is in classical mirror manufacturing methods, and in some preferred embodiments of the invention, said metal coating is constituted by a said reflective layer of silver. This has the advantage of economy in that the classical coppering step is eliminated, thereby saving on materials and manufacturing time. It is extremely surprising that contacting a silver layer with a treatment solution in accordance with this invention, such as a solution containing ions of Al(III), and then painting it can protect the silver layer against corrosion and abrasion as well as a classical copper layer which is then painted with a paint containing a lead-based pigment.

In other preferred embodiments of the invention, said metal coating is constituted by a said reflective layer of silver and a thin overcoating film of copper. Such film may contain copper in an amount of the order of 300 mg/m$^2$. The presence of such a thin copper layer has been found to give improved results when the reflective article is subjected to certain accelerated ageing tests designed to give an indication of resistance to attack by acids. This is extremely surprising, because we have also found that the presence of a rather thicker copper layer, for example a layer containing copper in an amount of 600 mg/m$^2$, tends to render the protective treatment of this invention ineffective or at least unpredictable. Of course, such embodiments are not so economically advantageous as those in which no copper film is formed, but as has been stated, the presence of a thin copper layer gives surprising results in terms of resistance to certain accelerated ageing tests.

In embodiments of the invention in which the reflective metal coating is not transparent, it is preferred that said metal coating is deposited onto a sensitized surface of the substrate using at least one metallizing solution. Deposition of the metal coating from a metallizing solution is very much less expensive than by other techniques such as vacuum deposition.

The protective treatment should be applied to the metal coating as soon as possible after deposition in order to achieve the maximum benefit. In the case of a metal coating deposited from one or more metallizing solutions, the treatment may be applied to a warm and dry layer of metal, that is to say to a layer of metal after that layer has been formed, rinsed and then dried, for example at about 60° C., or it may be applied to a wet layer of metal at ambient temperature, that is, directly after rinsing of the freshly formed metal coating. The results obtained are equivalent, but for reasons of speed and manufacturing cost it is preferred that the freshly formed metal coating is rinsed and then contacted with a said treatment solution while still wet.

In some embodiments of the invention, the treatment solution is an aqueous solution of a bromide, iodide, or acetate, but advantageously, the treatment solution is an aqueous solution of chloride or of sulphate. Such solutions are easy to handle and give very good results in conferring corrosion resistance upon the metal coating.

It is particularly surprising that good protection can be afforded to a silver layer which has been formed by a vacuum deposition technique by treating it with such an aqueous solution. We have found that such layers are generally hydrophobic in nature and it would be expected that it would not be possible, or that it would at least be very difficult, to achieve a uniform and effective treatment of such a silver layer in an economical manner.

In some preferred embodiments of the invention, said treatment solution additionally contains ions of Sn(II). Solutions of tin(II) salts are particularly effective in conferring good corrosion resistance, and a reflective article, such as a mirror, treated with a solution containing Sn(II) ions may be protected against corrosion and abrasion as well as or even better than a mirror made by a classical process.

Solutions of said salts may also be used economically. As little as a few mg/m$^2$ tin sprayed in solution onto the reflective article is quite sufficient to afford good protection, and it is considered that the spraying of quantities greater than 1500 mg/m$^2$ affords no commensurate increase in corrosion resistance. Indeed, using greater quantities may have a deleterious effect in decreasing adherence between the reflective coating and the paint which is subsequently applied.

DESCRIPTION OF THE PREFERRED EMBODIMENT

Preferred embodiments of the invention will now be described by way of example only.

EXAMPLE 1

Mirrors according to the invention are manufactured on a classical mirror production line. Sheets of glass are polished and sensitized using a solution of stannous chloride in the usual way. The sheets are then sprayed with a classical silvering solution containing a silver salt and a reducing agent, the spraying rate being such as to form on each glass sheet a layer containing silver in an amount of about 1000 mg/m$^2$. The silvered glass is then rinsed and dried at about 60° C. The glass is then oriented vertically, and an acidic aqueous solution containing 83 mg aluminium chloride per liter is poured over it. The glass is rinsed, dried and then painted in two coats to a total thickness of about 50 μm. The paints used, both from Merckens, were an alkyde-acrylic for the first coat and an alkyde for the second coat.

Mirrors manufactured in this way have been subjected to different accelerated ageing tests.

One indication of the resistance to ageing of a mirror incorporating a metallic film can be given by subjecting it to a copper-accelerated acetic acid salt spray test known as the CASS Test in which the mirror is placed in a testing chamber at 50° C. and is subjected to the action of a fog formed by spraying an aqueous solution containing 50 g/L sodium chloride, 0.2 g/L anhydrous cuprous chloride with sufficient glacial acetic acid to bring the pH of the sprayed solution to between 3.0 and 3.1. Full details of this test are set out in International Standard ISO 3770-1976. Mirrors may be subjected to the action of the saline fog for different lengths of time, whereafter the reflective properties of the artificially aged mirror may be compared with the reflective properties of the freshly formed mirror. We find that an exposure time of 120 hours gives a useful indication of the resistance of a mirror to ageing. We perform the CASS Test on 10 cm square mirror tiles, and after exposure to the copper-accelerated acetic acid salt spray for 120 hours, each tile is subjected to microscopic examination. The principal visible evidence of corrosion is a darkening of the silver layer and peeling of the paint around the margins of the mirror. The extent of corrosion is noted at five regularly spaced sites on each of two opposed edges of the tile and the mean of these ten measurements is calculated. One can also measure the maximum corrosion present at the margin of the tile to obtain a result which is again measured in micrometers.

A second indication of the resistance to ageing of a mirror incorporating a metallic film can be given by subjecting it to a Salt Fog Test which consists in subjecting the mirror to the action, in a chamber maintained at 35° C., of a salt fog formed by spraying an aqueous solution containing 50 g/L sodium chloride. We find that an exposure time of 480 hours to the Salt Fog Test gives a useful indication of the resistance of a mirror to ageing. The mirror is again subjected to microscopic examination, and the corrosion present at the margin of the tile is measured to obtain a result in micrometers, in the same way as in the CASS Test.

10 cm square mirror tiles manufactured in accordance with Example 1 were tested by both the above tests, together with a Test Sample not according to the invention.

Test Sample 1 was manufactured as specified in Example 1 save that the aluminium chloride treatment of that silver layer was omitted, and a coppering solution of traditional composition was sprayed onto the silver layer to form a layer containing copper in an amount of 300 mg/m$^2$ prior to rinsing and drying and then painting. The silver and paint layers were applied as described in Example 1.

The results of the two ageing tests on the mirror of Example 1 and the Test sample were as follows.

| Mirror | CASS test maximum in $\mu$m | CASS test mean in $\mu$m | Salt fog test mean in $\mu$m |
| --- | --- | --- | --- |
| Test sample 1 | 493 | 817 | 81 |
| Example 1 | 179 | 322 | 37 |

The aluminium chloride treatment of the silver layer of the mirror of Example 1 thus considerably diminishes the mirror edge corrosion even as compared with a mirror having a silver layer which is protected by a classical copper protective layer (Test Sample 1).

In a first variant of this Example, after the treatment with aluminium chloride, but before painting, the silver coating was sprayed with a solution containing 0.1% by volume gamma-aminopropyl triethoxysilane (Silane A1100 from Union Carbide). After further rinsing and drying, the silanised silver layer was painted as before.

In a second variant, the aluminium chloride solution was sprayed onto the coated glass while the coating was still wet after rinsing.

In a third variant of this Example, instead of being provided with a mirror coating, the glass was coated, in a magnetron, with a 30 nm layer of ZnO and then a 30 nm layer of silver. To form the coatings, a sheet of glass was introduced into a processing chamber comprising two planar magnetron sources having targets respectively of zinc and silver, an entry and an outlet gas lock, a conveyor for the glass, power sources, sputtering gas inlets and an evacuation outlet. The sheet was transported past the sputtering sources with the zinc source activated and cold sputtered with oxygen gas to give the zinc oxide layer. The oxygen was then evacuated and the sheet moved back past the sputtering sources with the silver source activated but this time with argon as sputtering gas, in order to form the silver layer. The sheet was then removed and cut into tiles which were treated with the aluminium chloride solution. Of course no paint was applied to the transparent coating on these tiles.

EXAMPLE 2

Example 1 was repeated using two different non-opalescent, aqueous treatment solutions. The solutions used were acidified by the addition of hydrochloric acid so that they had a pH of between 1 and 3.5, and their compositions were as follows:

Example 2a: a solution containing 59 mg/L SnCl$_2$ and 48 mg/L TiCl$_3$

Example 2b: a solution containing about 100 mg/L SnCl$_2$ and 10 mg/L TiCl$_3$

The two mirrors were then painted as specified in Example 1.

The results of the two ageing tests specified in Example 1 on these two mirrors were as follows.

| Mirror | CASS test mean in $\mu$m | Salt fog test mean in $\mu$m |
| --- | --- | --- |
| Example 2a | 153 | 37 |
| Example 2b | 140 | 32 |

These mirrors also have very good resistance to corrosion as measured by the CASS and Salt Fog Tests.

EXAMPLES 3 TO 5

The procedure specified in Example 1 was modified in that different treatment solutions were caused to flow over the silvered glass prior to painting. The mirrors were painted as specified in Example 1.

The treatment solutions applied to the different mirrors were as follows:

Example 3: an aqueous solution containing 77 mg/L CrCl$_2$

Example 4: an aqueous solution containing 98 mg/L VCl$_3$

Example 5: an aqueous solution containing 96.4 mg/L TiCl$_3$

A Test Sample, Test Sample 2, was also manufactured in the same way, save that the silver layer was not treated prior to painting.

The mirrors of Examples 3 to 5 and Test Sample 2 were subjected to the tests specified in Example 1, with the following results.

| Mirror | CASS test mean in $\mu m$ | CASS test maximum in $\mu m$ | Salt fog test mean in $\mu m$ |
| --- | --- | --- | --- |
| Test sample 2 | 3100 | 4900 | 132 |
| Example 3 | 3000 | 4100 | 24 |
| Example 4 | 240 | 769 | <18 |
| Example 5 | 147 | 404 | <18 |

Treatment of the silver layer using a solution of V(III) or Ti(III) chloride strongly reduces the corrosion observed in the silver layer after the accelerated ageing tests. The Salt Fog Test indicates that treatment with $CrCl_2$ also strongly reduces corrosion when measured by the Salt Fog Test, though when measured by the CASS Test, the reduction in corrosion is not great.

EXAMPLE 6

The procedure specified in Example 1 was modified in that a different treatment solution was caused to flow over the silvered glass prior to painting, and in that different paint was used.

The treatment solution applied to the mirror was an aqueous solution containing 79 mg/L $FeCl_2$ A Test Sample, Test Sample 3, was manufactured at the same time, no treatment solution being used.

When subjected to the CASS Test, the results were as follows.

| Mirror | CASS test mean in $\mu m$ | CASS test maximum in $\mu m$ |
| --- | --- | --- |
| Test sample 3 | 3252 | 4319 |
| Example 6 | 1478 | 3218 |

The ferrous chloride treatment also affords some protection to the reflective layer of the mirror.

We have found that a similar treatment using a cuprous salt such as cuprous iodide also affords a degree of protection to a silver layer on a sheet of glass, and also that the use of a salt of indium (I or II) can also give a degree of protection against corrosion.

What is claimed is:

1. A method of manufacturing a reflective article comprising a reflective metal coating deposited on a glass substrate, the method comprising the steps of, in the order recited:
   (a) forming a metal coating comprising a reflective layer of silver on a surface of the glass substrate;
   (b) rinsing the metal coating;
   (c) contacting the metal coating with an aqueous treatment solution containing ions of at least one metal selected from the group consisting of Cr(II); V(II or III); Ti(III or II); Fe(II); In(I or II); Cu(I); and Al(III); and
   (d) washing and drying the thus treated metal coating.
2. The method according to claim 1, wherein the glass substrate is a glass sheet, and wherein the metal coating is deposited onto the glass sheet as an opaque coating to form a mirror.
3. The method according to claim 2, wherein said metal coating is coated with a protective layer of paint.
4. The method according to claim 3, wherein said metal coating is contacted with a silane before painting.
5. The method according to claim 3, wherein said paint is substantially lead-free.
6. The method according to claim 1, wherein a surface of the substrate is sensitized, and wherein said metal coating is formed by being deposited onto the sensitized surface of the substrate using at least one metallizing solution.
7. The method according to claim 6, wherein the freshly formed metal coating is rinsed and then contacted with said aqueous treatment solution while still wet.
8. The method according to claim 1, wherein said aqueous treatment solution is an aqueous solution of one of a chloride or a sulfate.
9. The method according to claim 1, wherein said aqueous treatment solution additionally contains ions of Sn(II).
10. The method according to claim 1, wherein said metal coating is formed by depositing a reflective layer of silver which constitutes said metal coating.
11. The method according to claim 1, wherein said metal coating is formed by depositing a reflective layer of silver and overcoating the silver layer with a thin film of copper.
12. A method of manufacturing a reflective article comprising a reflective metal coating deposited on a glass substrate, the method comprising the steps of:
    (a) forming a metal coating comprising a reflective layer of silver on a surface of the glass substrate;
    (b) contacting the metal coating with an aqueous treatment solution containing ions of at least one metal selected from the group consisting of Cr(II); V(II or III); Ti(III or II); Fe(II); In(I or II); Cu(I); and Al(III); and
    (c) washing and drying the thus treated metal coating,
    wherein the glass substrate is a glass sheet, and wherein the metal coating is deposited onto the glass sheet as a transparent coating, and the metal coated glass sheet is held in spaced relation from at least one other glass sheet to form a hollow glazing unit, the metal coating being located inside the glazing unit.
13. A method of manufacturing a reflective article comprising a reflective metal coating deposited on a glass substrate, the method comprising the steps of:
    (a) forming a metal coating comprising a reflective layer of silver on a surface of the glass substrate;
    (b) contacting the metal coating with an aqueous treatment solution containing ions of at least one metal selected from the group consisting of Cr(II); V(II or III); Ti(III or II); Fe(II); In(I or II); Cu(I); and Al(III); and
    (c) washing and drying the thus treated metal coating,
    wherein said metal coating is formed by being deposited by vacuum deposition.

* * * * *